(No Model.)

S. ATKINSON.
CARRIAGE SPRING.

No. 302,618. Patented July 29, 1884.

WITNESSES:
R. A. Whaclesey
C. M. Clark

INVENTOR,
Samuel Atkinson
BY George H. Christy
ATTORNEY.

UNITED STATES PATENT OFFICE.

SAMUEL ATKINSON, OF HULTON, PENNSYLVANIA.

CARRIAGE-SPRING.

SPECIFICATION forming part of Letters Patent No. 302,618, dated July 29, 1884.

Application filed March 29, 1884. (No model.)

*To all whom it may concern:*

Be it known that I, SAMUEL ATKINSON, a subject of the Queen of Great Britain, residing at Hulton, in the county of Allegheny and State of Pennsylvania, have invented or discovered a certain new and useful Improvement in Carriage-Springs, of which improvement the following is a specification.

Figure 1:
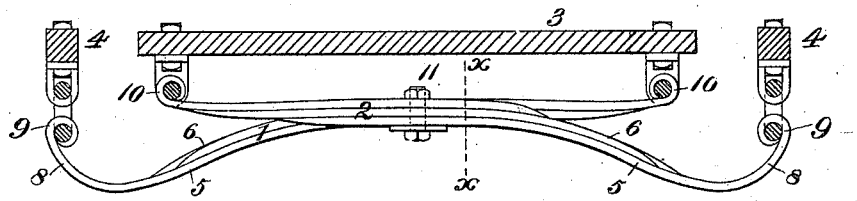
Figure 2:
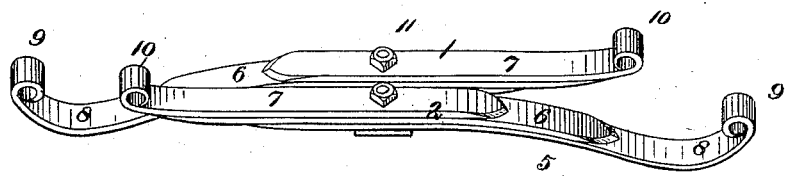
Figure 3:
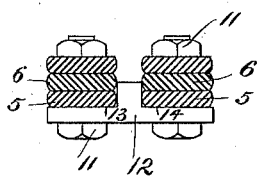

In the accompanying drawings, which make part of this specification, Figure 1 is a view in side elevation of my improved spring, illustrating the manner of attaching the spring to the body and side bars of the buggy. Fig. 2 is a perspective view of the spring. Fig. 3 is a transverse section on the line *x x*, Fig. 1.

My invention relates to that class of springs which are attached to the side bars of a buggy and extend across and support the body of the buggy at its sides, said springs being generally known as "side-bar" springs.

The object of my invention is to so construct carriage and similar springs that the leaves which are attached to the side bars and the body of the carriage shall be braced and supported, when subjected to strains, by the other leaves forming the spring, and to overcome the necessity of uniting at the center the members of a pair in order to prevent the separation of the leaves of each member when a load is placed on them, as has heretofore been the case.

My improved spring consists of two similarly-constructed parts or members, 1 and 2, arranged alongside of each other, as shown, each half being attached at one end to one of the side bars, 4, and at the other to the opposite side of the body, 3, as shown. Each of these parts or members consists of a series of leaves, 5, 6, and 7. The leaf 5 is made with an upwardly-turned goose-neck, 8, provided at its end with an eye, 9, for attachment by any suitable means to one of the side bars, the main body of the leaf being made semi-elliptic. On the leaf 5 is placed the leaf 6, which is formed with reverse curves at its ends, as shown; and on this leaf is placed the leaf 7, which is also made with reverse curves, and provided at its upturned end with an eye, 10, whereby to attach this end to one side of the body of the buggy or carriage. The leaves overlap each other, as shown, and are secured together by the bolt 11. Each of the members or parts of the spring, which are constructed exactly alike, are placed and secured together alongside of each other, with the goose-necks at opposite ends of the spring so formed. The two members are secured together at their middle portion by a clip, 12, which is provided with two recesses, 13 and 14, of a width equal to the width of the member-springs, which are placed in said recesses, and secured therein by the bolts 11, which also hold the leaves of each member together. The spring, formed as above, is attached by its goose-neck ends to the side bars of the carriage, and the other ends of the spring are secured to the body of the carriage at opposite sides thereof.

It will be seen from the above that if a load were placed at either side of the body the opposite side thereof would be depressed to the same degree as the side at which the load is placed, for, as the two parts of the spring are rigidly secured together at their middle portion, any motion communicated to one member of the spring will be transmitted to the other member through the rigid connection, thus preventing any endwise tipping or rocking of the body, and also preventing any unequal strains arising from unequal loading of the body.

Although I have shown and described each spring as made of three leaves, I do not wish to confine myself to such a number, as each member may be made of one or any number of leaves without departing from the spirit of my invention. A further and very important characteristic of my spring is that the leaves which are attached to the body and side bars are arranged on opposite sides of the springs, and that between them is arranged the middle leaf, and that the inner ends of the outside leaves pass by and overlap each other. This arrangement of the leaves insures a bracing of each end of the spring against the strain to which they are subjected. In that form of springs in which the opposite ends of the same leaf are attached to the body and side, and the other leaves are arranged on one side only of this main leaf, only one end of the main leaf is braced against strains, which act down at one end—*i. e.*, the body end—and up at the opposite or side bar end; but in my spring it will be noticed that the leaf which is attached to the body, and is, therefore, subjected to downward strains, is placed upon the middle leaf, which braces it, and that the inner end of the leaf attached to the side bar will assist in this bracing, as it extends some distance under the top or body leaf. At the opposite end of the spring, which is subjected to upward strains, the above construction is reversed; the leaf attached at its end to the side bar is located under the middle leaf and the inner end of the upper leaf. Any strains, therefore, to which my spring is subjected will tend to force the leaves composing the same more nearly together.

I claim herein as my invention—

1. In a spring, the combination of a top leaf attached at one end to the body of the vehicle, a bottom leaf attached at one end to the side bar, and a leaf arranged between and having its ends overlapping the inner ends of said top and bottom leaves, substantially as described.

2. In a spring, the combination of a top leaf attached at one end to the body of the vehicle, a bottom leaf attached at one end to the side bar, the inner ends of said leaves overlapping, and a leaf arranged between and having its ends overlapping the inner ends of said top and bottom leaves, substantially as described.

3. A spring consisting of two parts arranged and secured parallel with each other, each part consisting of the top and bottom leaves, 5 and 7, the outer ends of said springs being attached to the body and side bars, respectively, and the middle leaf, 6, located between and extending beyond the inner ends of the top and bottom leaves, substantially as set forth.

In testimony whereof I have hereunto set my hand.

SAMUEL ATKINSON.

Witnesses:
DARWIN S. WOLCOTT,
R. H. WHITTLESEY.